Sept. 23, 1941.  C. SAURER  2,256,752
RESILIENT MOUNTING
Original Filed May 17, 1938
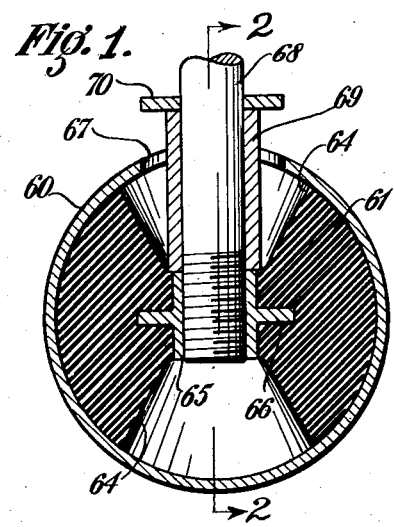
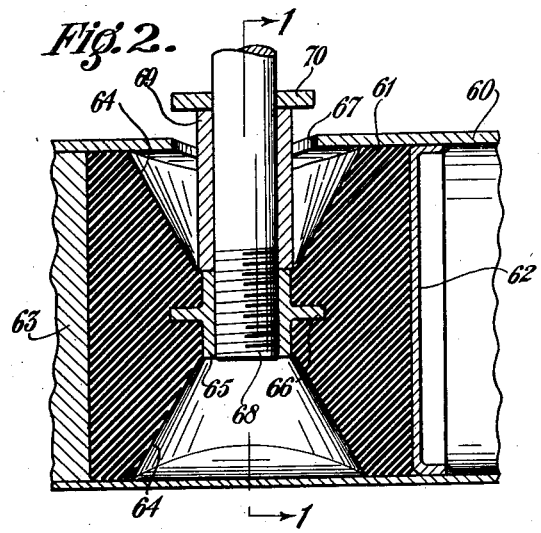
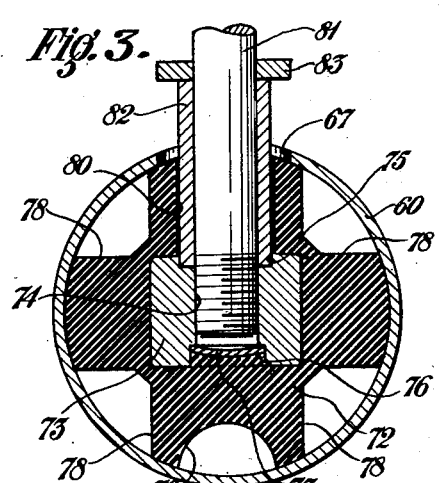
Inventor
Curt Saurer
Attorneys Patented Sept. 23, 1941

2,256,752

UNITED STATES PATENT OFFICE 2,256,752

RESILIENT MOUNTING

Curt Saurer, Akron, Ohio, assignor to The Firestone Tire & Rubber Company, Akron, Ohio, a corporation of Ohio Original application May 17, 1938, Serial No. 208,417. Divided and this application February 2, 1939, Serial No. 254,191

5 Claims. (Cl. 248—22).

This invention relates to resilient mountings, and more especially it relates to yielding structures that may be interposed between two bodies, of which one body at least is a vibratory body, for suppressing the translation of vibration between said bodies.

The improved mounting is especially adapted for use in motor vehicles, and may be used between the motor or engine and its supporting structure, or between the longitudinal and the transverse members of the frame or the body of the vehicle.

The chief objects of the invention are to provide an improved resilient mounting of the character mentioned; and to provide a resilient mounting that may be mounted in a number of different ways to control relative movement between two bodies in one or more directions while enabling substantial freedom of movement in other directions. Other objects will be manifest as the specification proceeds.

Of the accompanying drawing:

Figure 1 is a transverse section of an embodiment of the invention taken on the line 1—1 of Figure 2;

Figure 2 is a section on the line 2—2 of Figure 1; and

Figures 3 to 6, inclusive, are respective transverse sections of other embodiments of the invention.

This application is a division of my application Serial No. 208,417, filed May 17, 1938.

In the embodiment of the invention shown in Figures 1 and 2 there is shown a tubular frame or body member 60 that is circular in transverse section. Positioned interiorly thereof is a resilient mounting comprising a generally cylindrical body of resilient vulcanized rubber composition 61, that is retained in place therein by means of transverse partitions 62, 63 that are fixedly mounted in the member 60 in abutting relation to the opposite ends of the mounting. The rubber cushion 61 is formed with a pair of co-axial, diametrically opposed, frusto-conical recesses 64, 64, said recesses being disposed midway between the ends of the cushion with their large ends on the periphery thereof. Molded into the rubber body, between said recesses 64, is a co-axially disposed tubular metal insert 65 that is formed with female screw threads from end to end thereof, the ends of the insert being open to the recesses 64. The insert 65 is formed exteriorly with a medial radial flange 66 to provide a superior union of the insert with the rubber. The mounting is positioned within the member 60 so that the axis of recesses 64 and insert 65 is vertical, and coincident with the axis of an annular aperture 67 formed in the top of said member 60. Receivable in the threaded insert 65 is a cap screw 68 by means of which a supported member (not shown) may be connected to the resilient mounting. A sleeve 69 positionable about the cap screw 68 has its lower end resting upon the upper end of insert 65, there being a relatively heavy washer 70 carried upon the upper end of said sleeve constituting a seat for said supported member.

The arrangement is such that the rubber cushion 61 yieldingly resists relative movement between the supported member and the supporting member 60 in all directions by reason of the resistance to deformation of the rubber cushion, which deformation would put a portion of its structure under compressive stress and a portion under tension, the recesses 64 providing amply for displacement of the rubber under stress.

The resilient mounting shown in Figure 3 is designed for use in the same tubular body member 60 as the previously described embodiment of the invention. Said mounting comprises a resilient rubber cushion 72 that is mounted within the body member 60, between partitions (not shown) similar to the partitions 62, 63 of the previously described embodiment. Embedded within the rubber cushion 72 and vulcanized thereto is a metal core 73 that is rectangular in transverse section, said core extending longitudinally of the rubber structure, at the axis thereof, and terminating short of each end of the rubber so that the ends of the core are covered with rubber of sufficient thickness to provide an adequate cushion thereat. The core 73 is formed with a vertically disposed threaded bore 74 that is counterbored at 75 at its upper end and counterbored at 76 at its lower end, a dished metal insert 77 being mounted in the lower counterbore 76 to prevent rubber of the cushion 72 from flowing into the threaded bore 74 during vulcanization of the cushion.

The rubber cushion 72 is formed with longitudinally extending re-entrants or grooves 78, 78 from end to end thereof, each groove having two plane faces disposed at right angles to each other and substantially in alignment with two adjacent lateral faces of the core 73. There is also a longitudinally extending groove 79 along the bottom of the cushion, which groove is semicircular in transverse section. The top of the cushion 72 is formed with a vertical bore or recess 80 that extends to the core 73, said bore being co-axially disposed with relation to counterbore 75 and slightly larger than the latter. When the mounting is positioned in member 60, the axis of bore 80 is coincident with the aperture 67 of said member 60. Receivable in the threaded bore 74 of core 73 is a cap screw 81 by means of which a supported member (not shown) may be connected to the resilient mounting. A sleeve 82 positioned about said cap screw has its lower end seated in counterbore 75, there being a relatively heavy washer 83 carried upon the upper end of said sleeve, somewhat above the member 60, said washer constituting a seat for the supported member.

The arrangement is such that the rubber cushion 72 yieldingly resists relative movement between the supporting and the supported members in all directions by reason of the resistance to compression of the rubber, the grooves 78, 79 providing ample space for deformation and displacement of the rubber under load.

The resilient mounting shown in Figure 4 is essentially similar to that shown in Figure 3, so that only the distinguishing features need be mentioned in detail. The mounting comprises a resilient rubber cushion 86 that is mounted in the tubular member 60 in the manner previously described. Molded axially into the rubber body 86 is a metal core 87 that differs from core 73 only in that it is of cylindrical form. The rubber body is formed with longitudinally extending re-entrants or grooves 88, 88 that are disposed at top, bottom, and opposite sides of the cushion, each groove having two plane sides that meet at right angles at the bottom of the groove. The mounting has the same provision for connection with a supported member as the mounting shown in Figure 3.

The embodiment of the invention shown in Figure 5 of the drawing is identical with that shown in Figure 4, except in the shape of the grooves or channels 90 that extend longitudinally of the rubber cushion, said grooves being semi-circular in transverse section.

In the embodiment of the invention shown in Figure 6, the body structure comprises upper and lower half-tubes 140a, 140b that are laterally flanged to receive bolts 141, 141 by which they are secured together to provide a tubular body structure. The upper half-tube 140a is formed with an aperture 142 disposed centrally with relation to its lateral margins. Mounted within the body structure is a cushioning structure comprising a metal core 143 that is square in transverse section as shown, said core being integrally formed with a stud 144 that rises centrally from one face thereof and projects through said aperture 142, the latter having substantial clearance about the stud. The free end of the latter has a threaded portion 145 of reduced diameter for engagement with a supported structure (not shown). The core 143 has a cushion 146 of resilient rubber bonded thereto by vulcanization, the said cushion being in the form of blocks that are coextensive with the respective faces of the core. The rubber cushion is of such size as to be placed under compressive stress when confined within the body structure, that shape of the cushion being such as to provide spaces within the body permitting displacement of the rubber under compressive strains incidental to service.

It will be understood that the several structures shown in Figures 1, 3, 4, 5, and 6 include partitions (not shown) that are mounted within the tubular body structure, at each end of the mountings shown therein, so as to confine the rubber cushions and more effectively to enable them to oppose lateral movement of the supporting studs in the direction of the axis of each tubular body structure.

Other modifications may be resorted to without departing from the spirit of the invention, or the scope thereof as defined by the appended claims.

What is claimed is:

1. A resilient mounting for use between two relatively movable members comprising a rigid tubular metal structure for fixed association with one of said relatively movable members formed with an aperture in its wall, said mounting comprising a generally cylindrical body of rubber mounted in said tubular structure under compressive stress, said rubber body being formed with longitudinally extending surface grooves, a metallic core of rectangular section embedded centrally within said rubber body, said core being formed with a threaded bore opening onto the top face thereof, said rubber body being in fixed relation to the confronting surfaces of said rigid tubular structure and said core and the rubber structure having a recess co-axial with said threaded bore, said bore and recess being in axial alignment with the aperture in the tubular structure to admit a device for connecting the core to the other relatively movable member.

2. A resilient mounting for use between two relatively movable members of which one member is a rigid tubular metal structure for fixed association with one of said relatively movable members and being formed with an aperture in its wall, said mounting comprising a generally cylindrical body of rubber mounted in said tubular structure under compressive stress, said rubber body being formed with longitudinally extending surface grooves, and a metallic core embedded centrally within said rubber body, said rubber body being in a fixed relation to the confronting surfaces of said rigid tubular structure, said core being formed with a threaded bore and the rubber structure having a recess coaxial therewith, said bore and recess being in axial alignment with the aperture in the tubular structure to admit a device for connecting the core to the other relatively movable member.

3. A resilient mounting for use between two relatively movable members, said mounting comprising a rigid tubular member for fixed association with one of said relatively movable members, said rigid tubular member having an apertured wall and a hollow interior, a rubber body compressed between the inner surfaces of said member in fixed relation thereto and said rubber body being formed with longitudinally extending surface grooves, a metal block vulcanized to said rubber body and means associated with said metal block and extending from said member through the aperture therein for connecting said metal block to the other relatively movable member, said rigid tubular member being formed from two parts which are drawn together to compress said rubber body in producing the resilient mounting.

4. A resilient mounting for use between two relatively movable members, said mounting comprising a rigid tubular member for fixed association with one of said relatively movable members and having an aperture through its wall, a rubber body compressed between the surfaces of said tubular member in fixed relation thereto, said rubber body being formed with longitudinally extending surface grooves, and a metal block vulcanized to said rubber body, said metal block having an integral arm which extends through said rubber body and aperture to a point exterior of said member for connecting to the other relatively movable member, said rigid tubular member being formed from two parts which are drawn together to compress said rubber in producing the resilient mounting.

5. A resilient mounting for use between two relatively movable members of which one member is a tubular metal structure formed with an aperture in its wall, said mounting comprising a body of rubber having longitudinally extending grooves therein mounted in said tubular metal structure, said grooves forming longitudinally extending openings within said tubular metal structure with one opening being diametrically opposed to said aperture in said tubular metal structure, a rectangular core embedded centrally within said rubber body, said core being formed with a threaded bore having counter-bored ends, said rubber body having a recess coaxial with said threaded bore and being in alignment with the aperture in said tubular structure to admit a device for connecting the core to the other relatively movable member, and a metal insert carried in the end of said threaded bore removed from said aperture to prevent flow of rubber into said threaded bore during vulcanization.

CURT SAURER.